United States Patent [19]

Futaki

[11] Patent Number: 4,816,922
[45] Date of Patent: Mar. 28, 1989

[54] IMAGE INFORMATION-READING APPARATUS

[75] Inventor: Kenji Futaki, Kawasaki, Japan

[73] Assignee: Kabushiki Kaisha Toshiba, Kawasaki, Japan

[21] Appl. No.: 45,816

[22] Filed: May 4, 1987

[30] Foreign Application Priority Data

May 9, 1986 [JP] Japan .................................. 61-105862

[51] Int. Cl.$^4$ ............................................. H04N 1/04
[52] U.S. Cl. .................................. 358/285; 358/280; 358/293; 250/578
[58] Field of Search ............... 358/265, 293, 280, 256; 250/578

Primary Examiner—Edward L. Coles, Sr.
Attorney, Agent, or Firm—Cushman, Darby & Cushman

[57] ABSTRACT

Disclosed is an image information-reading apparatus for reading the image information on an original document placed on the document table. The apparatus is provided with a scanning means for irradiating the original document with light, and a photoelectric converting device for converting the light reflected from the original document into an electric signal. The apparatus is further provided with an adjusting mechanism for shifting a focusing position of light guided by the photoelectric converting device.

22 Claims, 7 Drawing Sheets

IMAGE INFORMATION-READING APPARATUS

BACKGROUND OF THE INVENTION

The present invention relates to an image information-reading apparatus for reading image information from an original document placed on a document table.

In this technical field, an image information-reading apparatus that can read a color image is well known. This color image information-reading apparatus is connected to a thermal head color printer, for example, to copy the color image on an original document. Specifically, in the image-reading apparatus, the original document on the original table is optically scanned, thereby reading the color image information on the original document as optical color signals. The image-reading apparatus transmits these optical color signals to the printer. The color image information is printed out by the printer, using color ink on a color ink ribbon. The printing of the color image is carried out on the basis of the color information signals which designate the respective colors. In the printer, the thermal head thermally transfers the color ink onto a recording sheet on the basis of image information signals such that an image of one color is superposed on an image of another, thus copying the color image.

The color image information-reading apparatus is provided with a scanning unit. The scanning unit includes both an exposure lamp by which the original document is irradiated with light to expose it, and a photoelectric converting device (such as a solid-state image-sensing element) by which the light reflected from the original document is converted into electric signals. In the scanning unit, fiber lenses, which are arranged in an array, are located between the original table and the photoelectric converting device, to focus the reflected light on the photoelectric converting device. In the photoelectric converting device, a large number of elements corresponding to the respective colors are arranged adjacent to one another, and color components of the image on the original document are focused on the corresponding elements in accordance with the region determined by the array of the fibers lenses. The scanning unit is moved parallel to the original table, thus scanning the entire area of the original document.

If it is intended that an original produced by a halftone printing process, such as photographs in a newspaper, should be read and copied by the apparatus described above, moiré noise may appear on the copy obtained. The moiré noise occurs when the focal point of the fiber lenses is located exactly in the image-forming plane, in other words, when the image is formed most clearly in the plane. It is, therefore, considered that the moiré noise is caused when the interval between the elements of the photoelectric converting device have an integral multiple relationship with the interval between the dots of the image. Incidentally, the moiré noise becomes especially conspicuous when the image to be copied has a straight pattern or is yellow.

SUMMARY OF THE INVENTION

The object of the present invention is to provide an image information-reading apparatus which can prevent the occurrence of moiré noise.

To achieve this object, the image information-reading apparatus of the present invention comprises:

a document table on which the original document is placed;

scanning means for scanning the original document, the scanning means including a light source for irradiating the original document with light, and a photoelectric converting device having a photodetecting surface for converting light reflected by the original document into an electric signal; and adjusting means for slightly shifting an imaging plane of original document light from the photodetecting surface.

DETAILED DESCRITPION OF THE INVENTION

Figure 1:
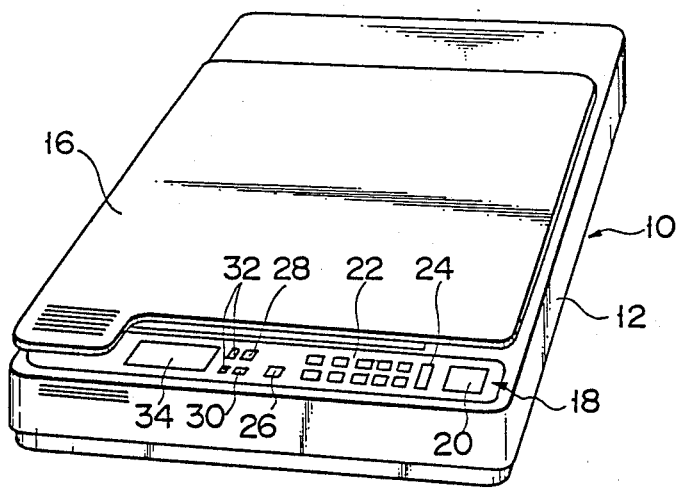
FIG. 1 is a perspective view of the image information-reading apparatus according to one embodiment of the present invention.

A preferred embodiment of the present invention will now be described in detail with reference to the accompanying drawings of FIGS. 1 to 15.

Image information-reading apparatus 10 of this embodiment has body 12 having a function for transducing image information into an electric signal. Document table 14, which is made of a transparent material, is formed on the upper portion of body 12 so as to support a document. Document cover 16 is fixed on document table 14 so as to cover the document placed on document table 14 as required. Operation panel 18 is disposed on the top of body 12. Operation panel 18 is provided with print key 20 for starting printing, ten keys 22 for specifying a print number, clear/stop key 24 for canceling the preset print number and stopping the printing operation, number display unit 26 for displaying a printed sheet number, halftone key 28 for specifying a halftone mode for a full-color image and the density thereof, mode keys 30 for specifying a monotone or 7-color mode and the density thereof, mode display unit 32 for displaying the preset mode, and display unit 34 for performing various types of display.

Figure 2:
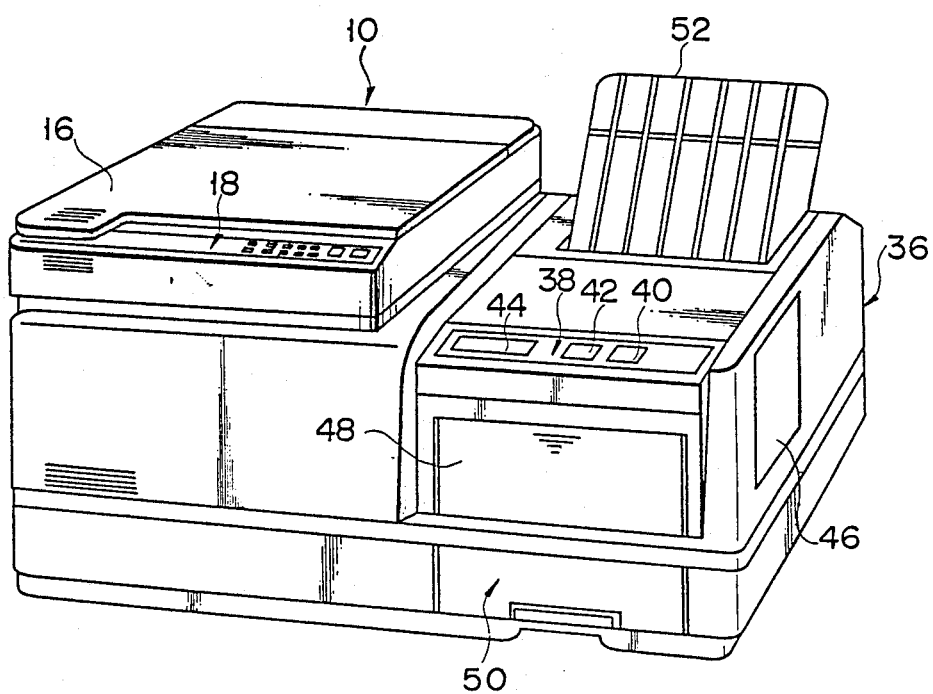
FIG. 2 is a perspective view illustrating a copying machine that uses the image information-reading apparatus shown in FIG. 1.

As shown in FIG. 2, image information-reading apparatus 10 is coupled to image-forming apparatus 36 for forming an image corresponding to the image information signal delivered from image information-reading apparatus 10.

In image-forming apparatus 36, an image is formed on paper in accordance with the image information signal from image information-reading apparatus 10. In other words, the document can be copied. Operation panel 18 is formed on the upper front portion of image-forming apparatus 36. Operation panel 18 is provided with on-line scanner key 40 for receiving the image information signal from image information-reading apparatus 10, eject key 42 for ejecting a ribbon cassette (not shown) containing an ink ribbon mounted in image-forming apparatus 36, and display unit 44 for displaying a selected operation mode. Door 46, which is mounted on image-forming apparatus 36, can be freely opened or closed for ejecting or loading the ribbon cassette. Manual feed guide plate 48, which is mounted on the front wall of image-forming apparatus 36, can be swung open to allow the operation of manually feeding a paper sheet or sheets in the manual feed mode. Paper cassette 50 is detachably mounted under guide plate 48 to automatically feed paper sheets in the automatic print mode. Inclined discharge tray 52 is disposed on the top of image-forming apparatus 36 to support copied paper sheets.

Figure 3:
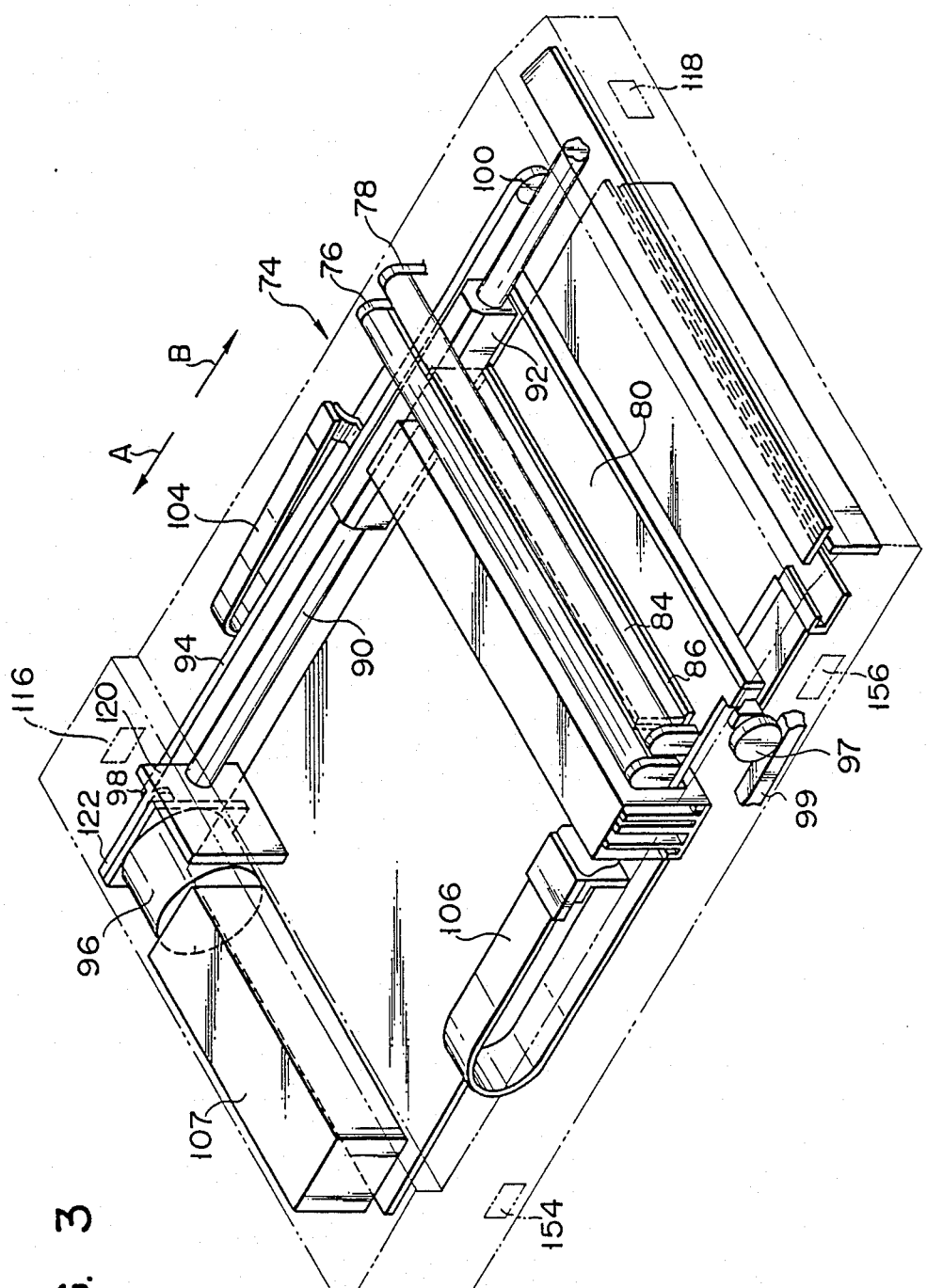
FIG. 3 is a perspective view schematically illustrating the interior of the image information apparatus shown in FIG. 1.
Figure 4:
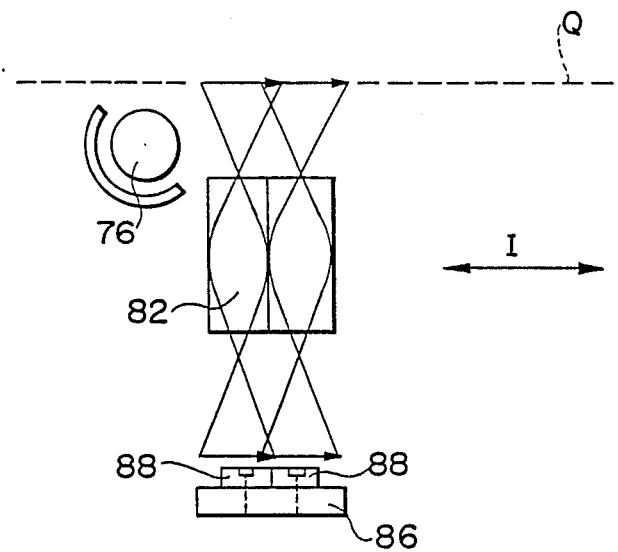
FIG. 4 is a view schematically illustrating a scanning unit.
Figure 5:
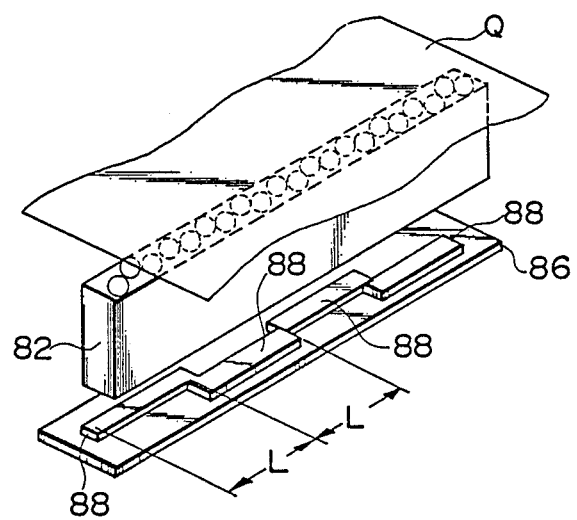
FIG. 5 is a perspective view illustrating the manner in which fiber lenses and solid-state image-sensing elements are arranged.

Referring now to FIG. 3, the mechanisms inside body 12 will be described. Scanning unit 74 is disposed in body 12 so as to be movable along document table 14. Scanning unit 74 serves to scan original document Q (FIGS. 4 and 5), thereby reading image information thereon. Scanning unit 74 includes a pair of exposure lamps 76 and 78 which extend parallel to each other and serve to apply light to document Q to expose the same. These lamps 76 and 78 are supported by carriage 80. Fiber lenses 82 and 84 are arranged between lamps 76 and 78. Under fiber lenses 82 and 84 lies photoelectric transmitter 86 for converting light into an electric signal. CCD (charged coupled device) elements 88 with color filters are arranged in photoelectric transmitter 86. Thus, as shown in FIG. 4, light beams from lamps 76 and 78 are converged through fiber lenses 82 and 84 after exposing document Q, and an optical signal indicative of the image information on document Q is converted into an electric signal by photoelectric transmitter 86.

As shown in FIG. 3, one side portion of carriage 80 is slidably mounted by means of sliding member 92 on guide shaft 90 for guiding carriage 80 in its movement. Also, one side portion of carriage 80 is fixed to part of toothed belt 94 as a timing belt. Timing belt 94 extends along guide shaft 90 and serves to reciprocate carriage 80 along guide shaft 90. Timing belt 94 is stretched between pulley 98 of pulse motor 96 and idle pulley 100. Thus, when pulse motor 96 is driven, scanning unit 74 moves in the direction indicated by arrow A or B. On the other portions of carriage 80, wheel 97 is supported on guide rail 99, which extends parallel to shaft 90.

In scanning unit 74, photoelectric transmitter 86 is coupled with an analog-to-digital (A/D) conversion unit 102 (shown in FIG. 6) for converting an output signal from photoelectric transmitter 86 into a digital signal. Both side portions of A/D conversion unit 102 are connected individually to flexible flat cables 104 and 106. Flat cables 104 and 106 supply an output signal from A/D conversion unit 102 to image-forming apparatus 36, and also feed electric power delivered from inverter 107 to lamps 76 and 78.

In image information-reading apparatus 10 constructed in this manner, scanning unit 74 moves along table 14, and converts the image information from the document into an electric signal and delivers it to image-forming apparatus 36. In image-forming apparatus 36, an image is formed on a paper sheet in accordance with the electric signal, that is, the document is copied.

Figure 6:
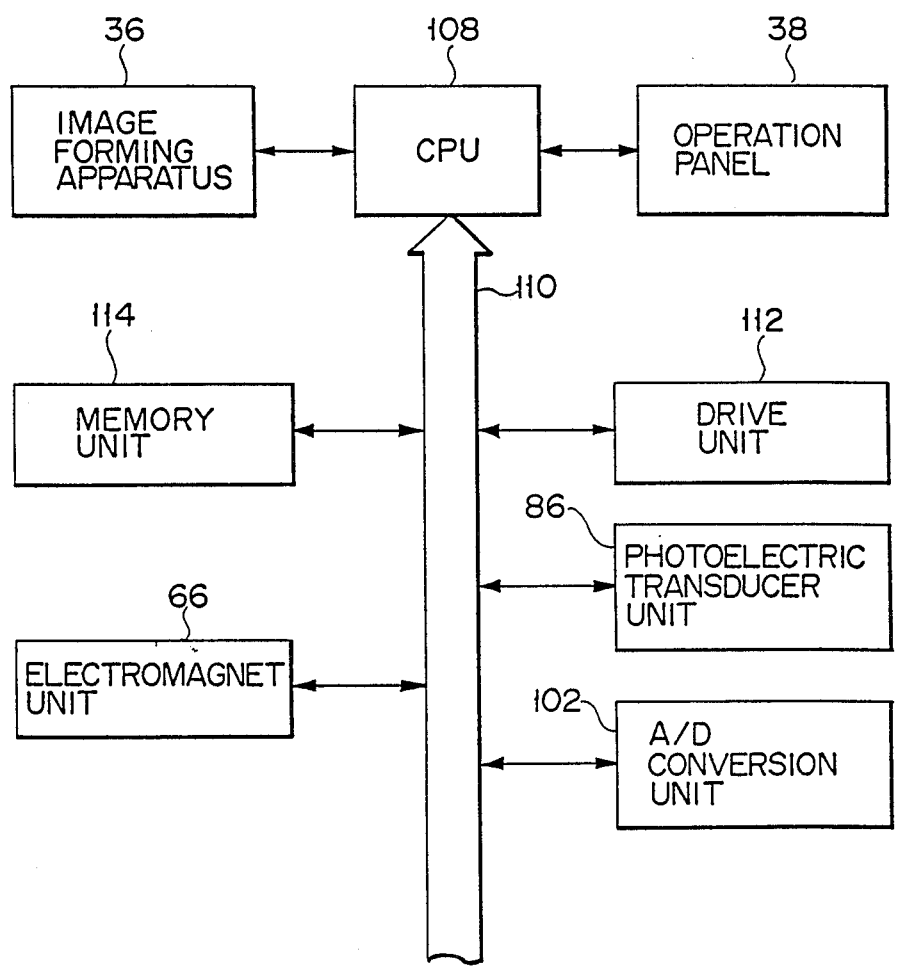
FIG. 6 is a block diagram of a control system of the image information-reading apparatus shown in FIG. 1.

Referring now to FIG. 6, a control system of image information-reading apparatus 10 will be described. Operation panel 18 and image-forming apparatus 36 are connected to CPU (central processing unit) 108.

CPU 108 is connected, by means of bus line 110, to drive unit 112 for controlling the drive of scanning unit 74, photoelectric transmitter 86, A/D conversion unit 102, and memory unit 114. Thus, the individual units are controlled by CPU 108. CPU 108 is further connected to operation panel 18 and image-forming apparatus 36. In this arrangement, if print key 20 on operation panel 18 is depressed, a drive signal is delivered from CPU 108 to drive unit 112. As a result, drive unit 112 drives scanning unit 74 to scan the document. In photoelectric transmitter 86, the image information on the document obtained from CCD elements 88 (shown in FIG. 5) is converted into light color signals, which are converted into digital signals by A/D conversion unit 102. The converted light color signals are delivered through bus line 110 to memory unit 114 to be stored therein, classified by color. The stored color signals are successively supplied to image-forming apparatus 36 through bus line 110 and CPU 108. Thus, the light color signals are converted into ink color signals. If image-forming apparatus 36 is of a multicolor-print type, the transfer operation is performed with the use of ink with colors corresponding to the converted light color signals. The paper sheet is fed back to a transfer start position every time a transfer cycle for one color is ended. Thus, a plurality of colors are transferred and superposed.

Figure 7:
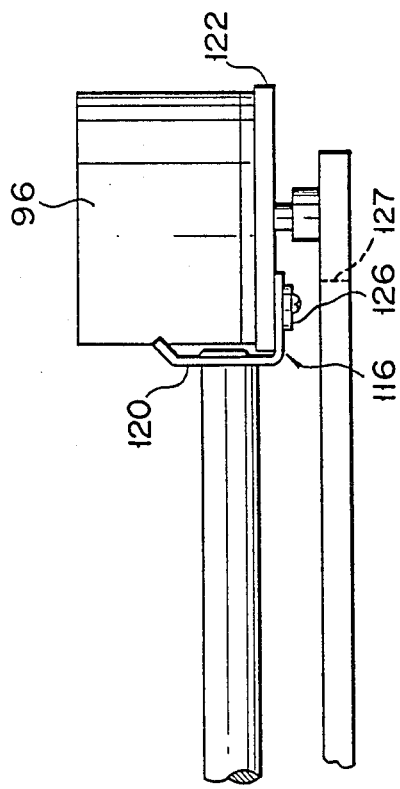
FIGS. 7 and 8 are front views showing major portions of a guide rail that supports the scanning unit.
Figure 7:
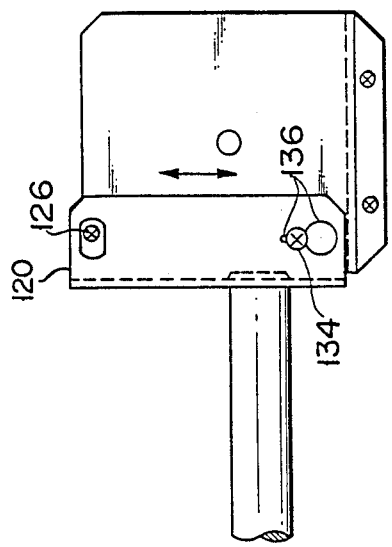
Figure 8:
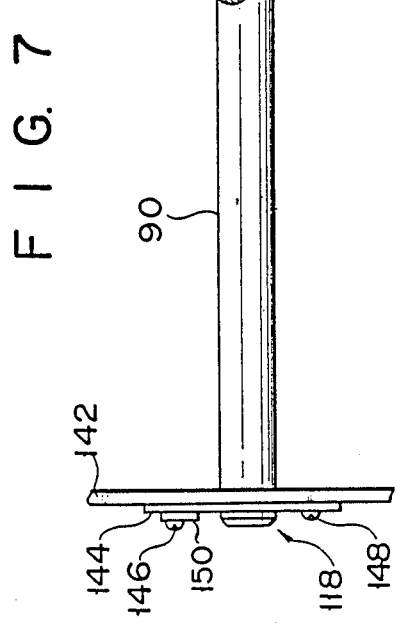
Figure 8:
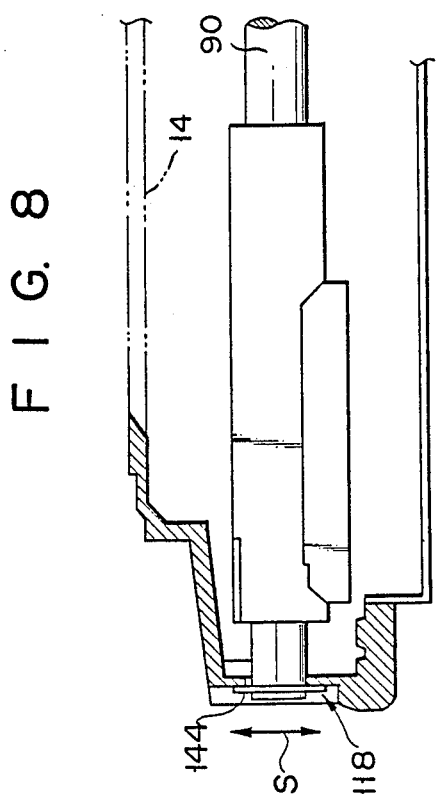
Figure 9:
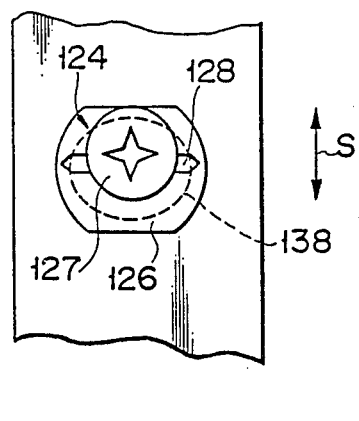
FIG. 9 is a front view illustrating a first postion-adjusting section of the guide rail.
Figure 10:
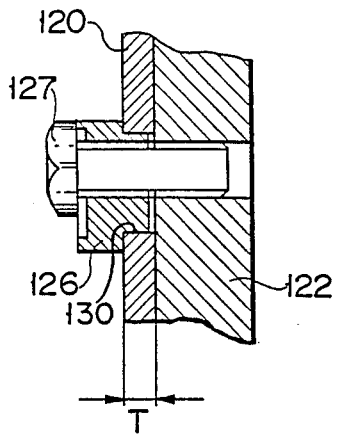
FIG. 10 is a sectional view of the first position-adjusting section shown in FIG. 9.
Figure 11:
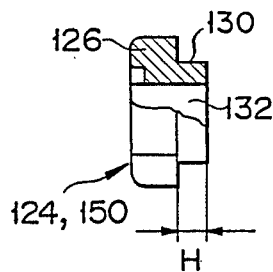
FIG. 11 is a partially sectional view of an adjusting screw.
Figure 12:
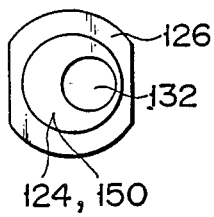
FIG. 12 is a plan view of the adjusting screw shown in FIG. 11.

As shown in FIGS. 7 and 8, first and second adjusting mechanisms 116 and 118 are provided at the respective ends of guide shaft 90. By use of the first and second adjusting mechanisms, guide shaft 90 can be moved away from document table 14. Adjusting plate 120 and eccentric cam 124 are connected to first adjusting mechanism 116 by means of screw 127. One end of guide shaft 90 is attached to adjusting plate 120. Eccentric cam 124 serves to attach adjusting plate 120 to motor block 122 in a movable manner. As shown in FIGS. 9 and 10, the surface of head 126 of eccentric cam 124 is provided with groove 128, which can be engaged with the tip of a screwdriver. Cam portion 130 is projected from the reverse side of head 126. As shown in FIGS. 11 and 12, in the sectional center of eccentric cam 124, hole 132 is extended, into which screw 127 is inserted. Thickness H of cam portion 130 is smaller than thickness T (referred to FIG. 10) of adjusting plate 120 by about 0.2 mm. Therefore, when eccentric cam 124 is fastened to motor block 122 by means of screw 127, adjusting plate 120 is fixed, being pressed by head 126.

As shown in FIG. 8, screw hole 136 is formed in the lower portion of adjusting plate 120. Fixing screw 134 is inserted into screw hole 136 to fix adjusting plate 120. However, since screw hole 136 is elongated in the vertical direction, adjusting plate 120 is allowed to move relative to fixing screw 134. Further, elongated hole 138 is formed in the upper portion of adjusting plate 120. Cam portion 130 of eccentric cam 120 is inserted into elongated hole 138. Elongated hole 138 is an elliptical hole longer in the vertical direction.

When adjusting plate 120 is in the fixed condition, fixing screw 134, inserted in screw hole 132, is fastened to motor block 122, as shown in FIGS. 7 and 8. Eccentric cam 124 is inserted into elongated hole 138 and is tightly fixed to motor block 122 by means of screw 126.

When adjusting the position of adjusting plate 120, fixing screw 134 is loosened, and then screw 127 is removed from eccentric cam 124. After engaging the tip of a screwdriver with groove 128 of head 126, eccentric cam 124 is rotated a predetermined distance. In response to this rotation of eccentric cam 124, adjusting plate 120 moves in the vertical direction. After adjusting the position of adjusting plate 120, adjusting plate 120 is fixed to motor block 122 by screws 127 and 134.

Figure 13:
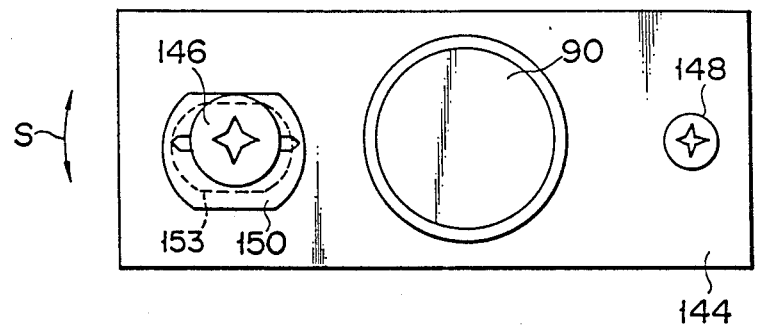
FIG. 13 is a front view illustrating a second position-adjusting section of the guide rail.
Figure 14:
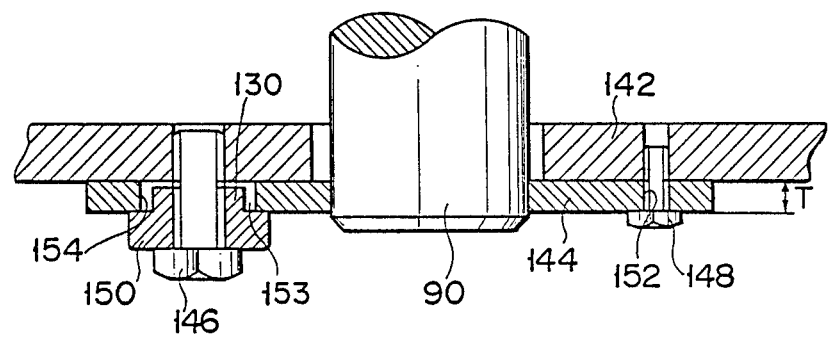
FIG. 14 is a sectional view of the second position-adjusting section shown in FIG. 11.

As shown in FIGS. 7 and 8, second adjusting mechanism 118 supports the other end of guide shaft 90 and attaches it to front frame 142 in such a manner as to be movable in the vertical direction. Second adjusting plate 144 is attached to front frame 142 by means of second screw 146 and second fixing screw 148. The end of guide shaft 90 is attached to the center of second adjusting plate 144. Second adjusting plate 144 is provided with second eccentric cam 150, which has the same construction as eccentric cam 124 (FIGS. 11 and 12) used in first adjusting mechanism 118. As shown in FIGS. 13 and 14, second adjusting plate 144 is provided with screw hole 152, into which second fixing screw 148 is inserted. (Screw hole 152 is shown in the right portion of FIG. 13.) As shown in the left portion of FIG. 13, second adjusting plate 144 is also provided with enlongated hole 153, into which cam portion 130 of second eccentric cam 150 is inserted. Second adjusting plate 144 is fastened or fixed to front frame 142 by means of second fixing screw 148 and second screw 146.

When adjusting second adjusting plate 144, second fixing screw 148 is loosened, and then second screw 146 is removed. Thereafter, second eccentric cam 150 is rotated a predetermined angle after engaging the tip of a screwdriver with the groove in head 126 of second eccentric cam 150. With this rotation of second eccentric cam 150, second adjusting plate 144 is rotated with second fixing screw 148 as a center, as indicated by arrow S in FIG. 13. After setting second adjusting plate 144 at a desirable position, second screw 146 and second fixing screw 148 are fastened, thus fixing second adjusting plate 144.

Figure 15:
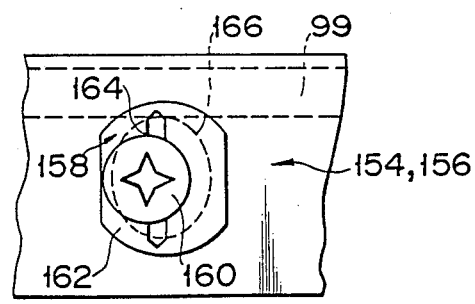
FIGS. 15 is a front view illustrating third and fourth position-adjusting sections.

As shown in FIG. 3, third and fourth adjusting mechanisms 154 and 156 are provided at the respective end portion of rail 99. In third and fourth adjusting mechanisms 154 and 156, eccentric cam 158 is secured to the lateral portion of body 12 by means of screw 160, as shown in FIG. 15. Head 162 of eccentric cam 158 is provided with groove 164, which can be engaged with the tip of a screwdriver. Elliptical cam portion 166 is projected from the reverse side of head 162 and extends into body 12. The circumferential surface of cam portion 166 is in contact with the lower portion of rail 99, thus supporting rail 99. Therefore, rail 99 can be moved up or down at one end by rotating eccentric cam 166.

As described above, four adjusting mechanisms are arranged at the respective four corner portions of body 12 of image information-reading apparatus 10. By changing the vertical position of each of these adjusting mechanisms, the position of reciprocating carriage 80 can be adjusted relative to the surface of document table 14. Therefore, it is possible both to maintain carriage 80 and document table 14 parallel to one another and to adjust the focal distance of the optical system (i.e., the distance between fiber lenses 82, 84 and document table 14).

A description will now be given of how the position of reciprocating carriage 80 is adjusted.

First, guide shaft 90 and guide rail 99 are adjusted to make them located at the imaging plane of the original document light, by use of first and second adjusting mechanisms 116 and 118. Since fiber lenses 82 and 84 and photoelectric transmitter 86 are placed on carriage 80, which reciprocates along guide shaft 90 and guide rail 99, photoelectric transmitter 86 can be set at the image-focusing position (imaging plane) by adjusting each of position-adjusting mechanisms 116, 118, 154 and 156. If the photoelectric transmitter is connected to an oscilloscope (not shown), the image-focusing position can be easily determined by finding the peak point of signals displayed in the oscilloscope.

After determining the image-focusing position, carriage 80 is moved up or down a predetermined distance (desirably within 1 mm) by use of first and second adjusting mechanisms 116 and 118. Accordingly, photoelectric transmitter 86 is changed in position with reference to document table 14, thus shifting photo-electric transmitter 86 slightly away from the image-focusing position. When shifting the photoelectric transmitter from the image-focusing position, first and third adjusting mechanisms 116 and 154 may be used, instead of first and second adjusting mechanisms 116 and 118. If necessary, all the adjusting mechanisms may be used. By slightly shifting photoelectric transmitter 86 from the image-focusing position, an image will be slightly defocused. This defocused image will be effective in eliminating moiré noise, which is apt to appear when reading an original produced by the halftone printing process.

In addition, the image focusing position of the optical system can be easily adjusted from outside body 12 by using only a screwdriver.

The present invention is not limited to the embodiment described above. It can be modified in various manners without departing from the scope of the invention. For example, the adjusting mechanisms are not limited to the ones adapted to adjust the position of the reciprocating carriage. They may be designed to adjust the position of the photoelectric transmitter or that of the fiber lenses, so as to shift the image-focusing position of the optical system.

In the above embodiment, the invention was described as being applied to an image information-reading apparatus for use with a color thermal printer apparatus. Needless to say, the invention is not limited to this. For example, it may be applied to an information-reading apparatus used for reading image information handled by a multi-color laser printer. It may also be applied to an information-reading apparatus for reading any other kind of information.

What is claimed is:

1. An image information-reading apparatus for eading image information on an original document, comprising:

a document table on which the original document is adapted to be placed;

scanning means for scanning the original document, the scanning means including a light source for irradiating the original document with light, and a photoelectric converting device having a photodetecting surface for converting light reflected by the original document into an electric signal; and adjusting means for slightly regulating a relative position between an imaging plane of the reflected light from the original document and the photodetecting surface to defocus an image for removal of moiré noise.

2. An apparatus according to claim 1, wherein the adjusting means adjusts the position of the photoelectric converting device such that the distance from the photoelectric converting device to the document table is changed.

3. An apparatus according to claim 2, wherein the scanning means is provided with a carriage which is movable along the original table and on which the photoelectric converting device is mounted, and wherein the adjusting means vertically changes the position of the carriage.

4. An apparatus according to claim 3, wherein the scanning means is provided with a pair of rails used for guiding the movement of the carriage and the adjusting means changes the position of the rails.

5. An apparatus according to claim 4, wherein the adjusting means includes a cam member which is in sliding contact with the rails, and the position of the rails is changed by rotating the cam member.

6. An apparatus according to claim 5, wherein the cam member includes a head in which a groove engageable with a screwdriver is formed, and the cam member is rotated by use of the screwdriver.

7. An apparatus according to claim 5, wherein the cam member is an eccentric cam, which is secured by means of a screw after adjustment.

8. An apparatus according to claim 5, wherein the adjusting means is located at one end of each of the rails such that the total number of the adjusting means is four, and the focusing position of the photoelectric converting device is adjusted by use of the four adjusting means.

9. An apparatus according to claim 1, wherein the scanning means is a fiber lens array for guiding light reflected from the original document toward the photoelectric converting device.

10. An apparatus according to claim 9, wherein fiber lenses of the array are arranged in a staggered fashion, and the photoelectric converting device is located along the fiber lens array.

11. An image information-reading apparatus for reading color image information on an original document, comprising;
    a document table on which the original document is adapted to be placed;
    scanning means for scanning the original document while running along the original document, the scanning means including a light source for irradiating the original document with light, and a photoelectric converting device having a photodetecting surface for converting light reflected by the original document into an electric signal, the photoelectric converting device being comprised of a plurality of photoelectric converting elements which can read light according to its colors; and
    adjusting means for slightly regulating a relative position between an imaging plane of the light from the original document and the photodetecting surface to defocus an image and to remove moire noise.

12. An apparatus according to claim 11, wherein the adjusting means adjusts the position of the photoelectric converting device such that the distance from the photoelectric converting device to the document table is changed.

13. An apparatus according to claim 12, wherein the scanning means is provided with a carriage which is movable along the original table and on which the photoelectric converting device is mounted, and wherein the adjusting means vertically changes the position of the carriage.

14. An apparatus according to claim 13, wherein the scanning means is provided with a pair of rails used for guiding the movement of the carriage and the adjusting means changes the position of the rails.

15. An apparatus according to claim 14, wherein the adjusting means includes a cam member which is in sliding contact with the rails, and the position of the rails is changed by rotating the cam member.

16. An apparatus according to claim 15, wherein the cam member includes a head in which a groove engageable with a screwdriver is formed, and the cam member is rotated by use of the screwdriver.

17. An apparatus according to claim 15, wherein the cam member is an eccentric cam, which is secured by means of a screw after adjustment.

18. An apparatus according to claim 15, wherein the adjusting means is located at one end of each of the rails such that the total number of the adjusting means is four, and the focusing position of the photoelectric converting device is adjusted by use of the four adjusting means.

19. An apparatus according to claim 11, wherein the scanning means is a fiber lens array for guiding light reflected from the original document toward the photoelectric converting device.

20. An apparatus according to claim 19, wherein fiber lenses of the array are arranged in a staggered fashion, and the photoelectric converting device is located along the fiber lens array.

21. An image information-reading apparatus for reading image information on an original document, comprising:
    means for receiving an original document;
    photoelectric converting means having a photodetecting surface for converting a light signal from the original document into an electric signal; and
    adjusting means for regulating a relative position between an imaging plane of light from the original document light and the photodetecting surface to defocus an image for removal of moire noise.

22. A method of removing moire noise while reading image information from an original document, comprising the steps of:
    placing the original document on a document table;
    scanning the original document by irradiating the original document with light;
    converting light reflected by the original document into a signal indicative thereof; and
    regulating a relative position between an imaging plane of the reflected light from the original document and the photodetecting surface in a way to shift the light focusing point to defocus an image, for removal of moire noise.

* * * * *